US012584008B2

(12) United States Patent
Grazzi et al.

(10) Patent No.: US 12,584,008 B2
(45) Date of Patent: Mar. 24, 2026

(54) POLYOLEFIN COMPOSITION FOR ROOFING APPLICATIONS

(71) Applicant: Basell Poliolefine Italia S.r.l., Milan (IT)

(72) Inventors: Michele Grazzi, Ferrara (IT); Claudio Cavalieri, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 625 days.

(21) Appl. No.: 18/015,937

(22) PCT Filed: Jul. 1, 2021

(86) PCT No.: PCT/EP2021/068172
§ 371 (c)(1),
(2) Date: Jan. 12, 2023

(87) PCT Pub. No.: WO2022/017758
PCT Pub. Date: Jan. 27, 2022

(65) Prior Publication Data
US 2023/0265273 A1 Aug. 24, 2023

(30) Foreign Application Priority Data
Jul. 24, 2020 (EP) .................................... 20187720

(51) Int. Cl.

| | |
|---|---|
| ***C08L 23/16*** | (2006.01) |
| ***C08F 2/00*** | (2006.01) |
| ***C08F 2/34*** | (2006.01) |
| ***C08F 210/16*** | (2006.01) |
| ***E04D 5/06*** | (2006.01) |
| ***E04D 5/10*** | (2006.01) |

(52) U.S. Cl.
CPC .............. *C08L 23/16* (2013.01); *C08F 2/001* (2013.01); *C08F 2/34* (2013.01); *C08F 210/16* (2013.01); *E04D 5/06* (2013.01); *E04D 5/10* (2013.01); *B32B 2262/0253* (2013.01); *B32B 2270/00* (2013.01); *B32B 2419/06* (2013.01); *C08L 2205/025* (2013.01); *C08L 2314/02* (2013.01)

(58) Field of Classification Search
CPC . C08L 23/16; C08L 2205/025; C08L 2207/02
See application file for complete search history.

(56) References Cited

U.S. PATENT DOCUMENTS

| | | | |
|---|---|---|---|
| 4,399,054 A | 8/1983 | Ferraris et al. | |
| 4,469,648 A | 9/1984 | Ferraris et al. | |
| 7,388,061 B2 | 6/2008 | Gao et al. | |
| 2003/0181597 A1 | 9/2003 | Glogovsky et al. | |
| 2012/0245260 A1 | 9/2012 | Lunghi et al. | |
| 2014/0045998 A1 | 2/2014 | Ceccarani et al. | |
| 2014/0080953 A1* | 3/2014 | Goberti .................. | C08L 23/14 524/400 |
| 2014/0087186 A1 | 3/2014 | Goberti et al. | |
| 2018/0334557 A1 | 11/2018 | Cavalieri et al. | |
| 2023/0279209 A1* | 9/2023 | Grazzi .................. | B29C 48/022 525/240 |

FOREIGN PATENT DOCUMENTS

| | | | | |
|---|---|---|---|---|
| EP | 45977 A2 | 2/1982 | | |
| EP | 361493 A1 | 4/1990 | | |
| EP | 395083 A2 | 10/1990 | | |
| EP | 472946 A2 | 3/1992 | | |
| EP | 728769 A1 | 8/1996 | | |
| RU | 144498 U1 | 8/2014 | | |
| RU | 2723510 C1 | 6/2020 | | |
| WO | 9844009 A1 | 10/1998 | | |
| WO | 98056830 A2 | 12/1998 | | |
| WO | 98056833 A1 | 12/1998 | | |
| WO | 98056834 A1 | 12/1998 | | |
| WO | 0055215 A1 | 9/2000 | | |
| WO | 0063261 A1 | 10/2000 | | |
| WO | 02100904 A1 | 12/2002 | | |
| WO | WO-03011962 A1 * | 2/2003 | ............ | C08F 210/06 |
| WO | 03076509 A1 | 9/2003 | | |
| WO | 0757160 A2 | 5/2007 | | |
| WO | 2009077481 A1 | 6/2009 | | |
| WO | 2010078494 A2 | 7/2010 | | |
| WO | 2011061134 A1 | 5/2011 | | |
| WO | 2011076664 A1 | 6/2011 | | |
| WO | 2012072426 A1 | 6/2012 | | |
| WO | 2012152802 A1 | 11/2012 | | |
| WO | 2017089125 A1 | 6/2017 | | |

OTHER PUBLICATIONS

The International Search Report and The Written Opinion for PCT/EP2021/068172 mailed Sep. 28, 2021.

* cited by examiner

*Primary Examiner* — Marc S Zimmer

(57) ABSTRACT

A polyolefin composition made from or containing:

(A) 18-35% by weight of a copolymer of propylene with an alpha-olefin, wherein the copolymer contains 2.0-4.0% by weight of the alpha-olefin and has a melt flow rate ($MFR_A$) ranging from 30 to 60 g/10 min; and (B) 65-82% by weight of a copolymer of propylene with an alpha-olefin, and optionally a diene, wherein the copolymer is made from or containing 20-35% by weight of the alpha-olefin, wherein the polyolefin composition is made from or containing a fraction that is soluble in xylene at 25° C. (XS(tot)) in an amount higher than 70% by weight;

the amounts of (A), (B), and the fraction soluble in xylene at 25° C. (XS(tot)) are based on the total weight of the polyolefin composition; and the melt flow rate (MFR) of the polyolefin composition ranges from 0.2 to 2.0 g/10 min.

15 Claims, No Drawings

POLYOLEFIN COMPOSITION FOR ROOFING APPLICATIONS

This application is the U.S. National Phase of PCT International Application PCT/EP2021/068172, filed Jul. 1, 2021, claiming benefit of priority to European Patent Application No. 20187720.6, filed Jul. 24, 2020, the disclosures of which are incorporated herein by reference in their entirety.

FIELD OF THE INVENTION

In general, the present disclosure relates to the field of chemistry. More specifically, the present disclosure relates to polymer chemistry. In particular, the present disclosure relates to thermoplastic polyolefin compositions and sheets or membranes made therefrom.

BACKGROUND OF THE INVENTION

In some instances, elastomers and thermoplastic polyolefins (TPOs) are used to produce sheets and membranes for single ply roofing.

In some instances, polyvinyl chloride (PVC) and other chlorinated TPOs were used to prepare heat-weldable thermoplastic roofing sheets. In those instances, plasticizers were used in PVC formulations to provide flexibility for roofing applications. The aging of membranes through the loss of plasticizers and the presence of chlorine in the polymer chains drove the substitution of PVC with chlorine-free thermoplastic polyolefins having mechanical properties for use in roofing sheets in absence of plasticizers.

In some instances, heterophasic polyolefin compositions are used to prepare sheets or membranes for roofing applications, the compositions being heat-weldable, endowed with mechanical properties for use in roofing applications, and easily recyclable.

SUMMARY OF THE INVENTION

In a general embodiment, the present disclosure provides a polyolefin composition made from or containing:

(A) 18-35% by weight of a copolymer of propylene with an alpha-olefin of formula $CH_2{=}CHR$, where R is H or a linear or branched C2-C3 alkyl, wherein i) the copolymer contains 2.0-4.0% by weight of the alpha-olefin, the amount of the alpha-olefin is based on the total weight of (A); and ii) the propylene copolymer has a melt flow rate ($MFR_A$), measured according to ISO 1133, 230° C., 2.16 kg, ranging from 30 to 60 g/10 min; and (B) 65-82% by weight of a copolymer of propylene with an alpha-olefin of formula $CH_2{=}CHR$, and optionally a diene, where R is H or a linear or branched C2-C8 alkyl and wherein the copolymer is made from or containing 20-35% by weight of the alpha-olefin, the amount of alpha-olefin is based on the total weight of (B), wherein iii) the polyolefin composition is made from or containing a fraction that is soluble in xylene at 25° C. (XS(tot)) in an amount higher than 70% by weight;

iv) the amounts of (A), (B), and the fraction soluble in xylene at 25° C. (XS(tot)) are based on the total weight of the polyolefin composition, the total weight being 100; and v) the melt flow rate (MFR), measured according to ISO 1133, 230° C., 2.16 kg, of the polyolefin composition ranges from 0.2 to 2.0 g/10 min.

In some embodiments, the present disclosure also provides a sheet or membrane made from or containing a polyolefin composition made from or containing:

(A) 18-35% by weight of a copolymer of propylene with an alpha-olefin of formula $CH_2{=}CHR$, where R is H or a linear or branched C2-C3 alkyl, wherein i) the copolymer contains 2.0-4.0% by weight of the alpha-olefin, the amount of the alpha-olefin is based on the total weight of (A); and ii) the propylene copolymer has a melt flow rate ($MFR_A$), measured according to ISO 1133, 230° C., 2.16 kg, ranging from 30 to 60 g/10 min; and (B) 65-82% by weight of a copolymer of propylene with an alpha-olefin of formula $CH_2{=}CHR$, and optionally a diene, where R is H or a linear or branched C2-C8 alkyl and wherein the copolymer is made from or containing 20-35% by weight of the alpha-olefin, the amount of alpha-olefin is based on the total weight of (B), wherein iii) the polyolefin composition is made from or containing a fraction that is soluble in xylene at 25° C. (XS(tot)) in an amount higher than 70% by weight;

iv) the amounts of (A), (B), and the fraction soluble in xylene at 25° C. (XS(tot)) are based on the total weight of the polyolefin composition, the total weight being 100; and v) the melt flow rate (MFR), measured according to ISO 1133, 230° C., 2.16 kg, of the polyolefin composition ranges from 0.2 to 2.0 g/10 min.

While multiple embodiments are disclosed, still other embodiments will become apparent to those skilled in the art from the following detailed description.

As will be apparent, certain embodiments, as disclosed herein, are capable of modifications in various aspects, without departing from the spirit and scope of the claims as presented herein. Accordingly, the following detailed description is to be regarded as illustrative in nature and not restrictive.

DETAILED DESCRIPTION OF THE INVENTION

In some embodiments, component (A) is a copolymer of propylene with ethylene.

In some embodiments, component (A) is a propylene copolymer made from or containing 3.0-3.9% by weight of the alpha-olefin. In some embodiments, the alpha-olefin is ethylene.

In some embodiments, the propylene copolymer (A) has a melt flow rate ($MFR_A$), measured according to ISO 1133, 230° C., 2.16 kg, ranging from 35 to 50 g/10 min., alternatively from 40 to 50 g/10 min., alternatively from 42 to 48 g/10 min.

In some embodiments, the propylene copolymer (A) is made from or containing an amount of fraction soluble in xylene at 25° C. ($XS_A$) lower than 9.0% by weight, alternatively in the range 4.0-9.0% by weight, alternatively 6.0-8.0% by weight, wherein the amount of $XS_A$ is based on the weight of copolymer (A).

In some embodiments, the propylene copolymer (B) is made from or containing an amount of fraction soluble in xylene at 25° C. ($XS_B$) higher than 80% by weight, alternatively higher than 85% by weight, alternatively higher than 90% by weight, wherein the amount of $XS_B$ is based on the weight of copolymer (B).

In some embodiments, the upper limit of the amount of the fraction of component (B) soluble in xylene at 25° C. ($XS_B$) is 97% by weight for each lower limit, wherein the amount of $XS_B$ is based on the weight of copolymer (B).

In some embodiments, component (B) is made from or containing a first copolymer (B1) and a second copolymer (B2) of propylene with an alpha-olefin of formula $CH_2{=}CHR$, and optionally a diene, where R is H or a linear or branched C2-C8 alkyl, wherein the total amount of alpha-olefin in the propylene copolymer (B) is 20-35% by weight and based on the weight of component (B).

In some embodiments, component (B) is made from or containing:

(B1) 30-60% by weight, alternatively 40-55% by weight, of a first copolymer of propylene with an alpha-olefin of formula $CH_2{=}CHR$, and optionally a diene, where R is H or a linear or branched C2-C8 alkyl, and wherein the first propylene copolymer is made from or containing 20-40% by weight, alternatively 25-35% by weight, of the alpha-olefin and a fraction soluble in xylene at 25° C. ($XS_{B1}$) higher than 80% by weight, alternatively higher than 85% by weight, alternatively higher than 90% by weight, wherein the amounts of alpha-olefin and $XS_{B1}$ are based on the weight of component (B1); and (B2) 40-70% by weight, alternatively 45-60% by weight, of a second copolymer of propylene with an alpha-olefin of formula $CH_2{=}CHR$, and optionally a diene, where R is H or a linear or branched C2-C8 alkyl, and wherein the second propylene copolymer is made from or containing 25-45% by weight, alternatively 30-43% by weight, of the alpha-olefin and a fraction soluble in xylene at 25° C. ($XS_{B2}$) higher than 80% by weight, alternatively higher than 85% by weight, alternatively higher than 90% by weight, wherein the amounts of alpha-olefin and of $XS_{B2}$ are based on the weight of component (B2), wherein the amounts of (B1) and (B2) are based on the total weight of the component (B), the weight being 100.

In some embodiments, the upper limit of the amount of the fraction of component (B1) and/or component (B2) soluble in xylene at 25° C. ($XS_{B1}$ and/or $XS_{B2}$) is 97% by weight for each lower limit, wherein the amounts of $XS_{B1}$ and $XS_{B2}$ are based on the weight of component (B1) and (B2), respectively.

In some embodiments, the alpha-olefin in components (B), (B1) and (B2) is independently selected from the group consisting of ethylene, butene-1, hexene-1,4-methy-pentene-1, octene-1, and combinations thereof. In some embodiments, the alpha-olefin is ethylene.

In some embodiments, the propylene copolymers (B), (B1), or (B2) are made from or containing recurring units derived from a diene. In some embodiments, the diene is independently selected from the group consisting of butadiene, 1,4-hexadiene, 1,5-hexadiene, ethylidene-1-norbonene, and combinations thereof.

In some embodiments, the total amount of recurring units deriving from a diene in the propylene copolymer (B), (B1), or (B2) ranges from 1 to 10% by weight, with respect to the relevant component, wherein the amount of recurring units deriving from a diene being based on the weight of the component (B).

In some embodiments, the polyolefin composition made from or containing a total amount of fraction soluble in xylene (XS(tot)) at 25° C. ranging from 70 to 90% by weight, alternatively from 70 to 80% by weight, wherein the amount of XS(tot) is based on the total weight of the polyolefin composition.

In some embodiments, the polyolefin composition has the melt flow rate (MFR) measured according to ISO 1133, 230° C., 2.16 kg ranging from 0.3 to 1.5 g/10 min., alternatively from 0.4 to 1.0 g/10 min.

In some embodiments, the melt flow rate (MFR) of the polyolefin composition measured according to ISO 1133, 230° C., 2.16 kg of from 0.2 to 2.0 g/10 min., alternatively from 0.3 to 1.5 g/10 min., alternatively from 0.4 to 1.0 g/10 min., is obtained directly from polymerization.

In some embodiments, the melt flow rate (MFR) of the polyolefin composition measured according to ISO 1133, 230° C., 2.16 kg of from 0.2 to 2.0 g/10 min., alternatively from 0.3 to 1.5 g/10 min., alternatively from 0.4 to 1.0 g/10 min., is not obtained by degrading (visbreaking) the polyolefin composition obtained from the polymerization reaction.

In some embodiments, the fraction soluble in xylene at 25° C. of the polyolefin composition XS(tot) has an intrinsic viscosity (XS(IV)) ranging from 2.5 to 4.5 dl/g, alternatively from 3.0 to 3.9 dl/g.

In some embodiments, the polyolefin composition is made from or containing 20-30% by weight of component (A) and 70-80% by weight of component (B), wherein the amounts of (A) and (B) being based on the total weight of the polyolefin composition, the total weight being 100.

In some embodiments, the polyolefin composition is made from or containing:

(A) 18-35% by weight, alternatively 20-30% by weight, of a copolymer of propylene with ethylene
 i) made from or containing 2.0-4.0% by weight of ethylene, alternatively 3.0-3.9% by weight, wherein the amount of ethylene being based on the weight of (A); and
 ii) having a melt flow rate ($MFR_A$) measured according to ISO 1133, 230° C., 2.16 kg ranging from 30 to 60 g/10 min., alternatively from 35 to 50 g/10 min., alternatively from 40 to 50 g/10 min., alternatively from 42 to 48 g/10 min; and (B) 65-82% by weight, alternatively 70-80% by weight, of a copolymer of propylene with ethylene made from or containing 20-35% by weight of ethylene, wherein the amount of ethylene being based on the weight of (B), wherein
 iii) the polyolefin composition is made from or containing an amount of fraction soluble in xylene at 25° C. (XS(tot)) higher than 70% by weight, alternatively from 70 to 90% by weight, alternatively from 70 to 80% by weight;
 iv) the amounts of (A), (B), and the fraction soluble in xylene at 25° C. (XS(tot)) are based on the total weight of the polyolefin composition, the total weight being 100;
 v) the melt flow rate (MFR) measured according to ISO 1133, 230° C., 2.16 kg of the polyolefin composition ranges from 0.2 to 2.0 g/10 min., alternatively from 0.3 to 1.5 g/10 min., alternatively from 0.4 to 1.0 g/10 min.; and
 vi) the fraction soluble in xylene at 25° C. of the polyolefin composition (XS(tot)) has an intrinsic viscosity (XS(IV)) ranging from 2.5 to 4.5 dl/g, alternatively from 3.0 to 3.9 dl/g.

In some embodiments, the melt flow rate (MFR) measured according to ISO 1133, 230° C., 2.16 kg of the polyolefin composition was obtained directly from polymerization.

In some embodiments, the polyolefin composition has one or more of the following properties:

- Flexural Modulus ranging from 40 to 90 MPa, alternatively from 50 to 80 MPa, alternatively from 50 to 70 MPa, wherein the Flexural Modulus is measured according to ISO 178:2019 on injection-molded specimens;
- Strength at break greater than or equal to 10.0 MPa, alternatively greater than or equal to 11.0 MPa, measured according to the method ISO 527 on injection-molded specimens;
- Charpy resistance at −40° C. equal to or higher than 6.0 $KJ/m^2$, measured according to ISO 179/1eA 2010 on injection-molded specimens;
- puncture resistance greater than or equal to 170 N, alternatively greater than or equal to 200 N, measured on a 1 mm-thick extruded sheet according to method ASTM D 4833 (punch diameter: 8 mm, crosshead speed: 300 mm/min);
- puncture deformation greater than or equal to 40 mm, alternatively greater than or equal to 45 mm, measured on a 1 mm-thick extruded sheet according to method ASTM D 4833 (punch diameter: 8 mm, crosshead speed: 300 mm/min); or
- Shore D value equal to or lower than 30, alternatively in the range 23-30, measured on 1 mm-thick extruded sheets according to method ISO 868 (15 sec).

In some embodiments, the strength at break is in the range of 10-15 MPa, alternatively 11-15 MPa. In some embodiments, the Charpy resistance at −40° C. is in the range of 6.0-10.0 $KJ/m^2$. In some embodiments, the puncture resistance is in the range of 170-250 N, alternatively 200-250 N. In some embodiments, the puncture deformation is in the range of 40-60 mm, alternatively 45-60 mm. In some embodiments, the polyolefin composition has Flexural Modulus, Strength at break, Charpy resistance at −40° C., puncture resistance, puncture deformation, and Shore D values in the ranges indicated above.

In some embodiments, the polyolefin composition has one or more of the following properties, measured on injection-molded specimens:

- Elongation at break, determined according to the method ISO 527, in the range 400-600%;
- Vicat softening temperature, determined according to the method ISO 306 (A50), in the range 40°-60° C.; or
- Shore A value, determined according to the method ISO 868 (15 sec), in the range 70-90.

In some embodiments, the polyolefin composition has one or more of the following properties, measured on 1 mm-thick extruded sheets:

- Tensile modulus in MD or TD, alternatively in MD and TD, determined according to the method ISO 527-3 (specimens type 2, Crosshead speed: 1 mm/min), in the range 30-70 MPa;
- Strength at break in MD or TD, alternatively in MD and TD, determined according to the method ISO 527-3 (Specimens type: 5, Crosshead speed: 500 mm/min), in the range 10.0-20.0 MPa, alternatively 13.0-18.0 MPa;
- Elongation at break in MD or TD, alternatively in MD and TD, determined according to the method ISO 527-3 (Specimens type: 5, Crosshead speed: 500 mm/min), in the range 600-800%;
- Tear resistance in MD or TD, alternatively in MD and TD, determined according to the method ASTM D 1004 (Crosshead speed: 51 mm/min; V-shaped die cut specimen), in the range 40-70 g, alternatively 40-60 g; or
- Shore A value, determined according to the method ISO 868 (15 sec), in the range 70-90.

In some embodiments, the polyolefin composition has the properties described above.

In some embodiments, the polyolefin composition is prepared by mixing in the molten state components (A) and (B). In some embodiments, the mixing occurs in an extruder.

In some embodiments, the polyolefin composition is prepared by sequential polymerization in at least two stages, wherein the second and each subsequent polymerization stage is carried out in the presence of the polymer produced and the catalyst used in the immediately preceding polymerization stage, the monomers and the catalyst being fed in the first polymerization stage.

In some embodiments, the polymerization processes to prepare the single components (A) and (B) or the sequential polymerization process to prepare the polyolefin composition are carried out in the presence of a catalyst selected from the group consisting of metallocene compounds, stereospecific Ziegler-Natta catalyst systems, and combinations thereof.

In some embodiments, the polymerization processes to prepare the single components (A) and (B) or the sequential polymerization process to prepare the polyolefin composition are carried out in the presence of a stereospecific Ziegler-Natta catalyst system made from or containing:

(1) a solid catalyst component made from or containing a magnesium halide support on which a Ti compound having a Ti-halogen bond is present, and a stereoregulating internal donor;

(2) optionally, an Al-containing cocatalyst; and (3) optionally, a further electron-donor compound (external donor).

In some embodiments, the solid catalyst component (1) is made from or containing a titanium compound of formula $Ti(OR)_nX_{y\_n}$, wherein n is between 0 and y; y is the valence of titanium; X is halogen and R is a hydrocarbon group having 1-10 carbon atoms or a —COR group. In some embodiments, titanium compounds having a Ti-halogen bond is selected from the group consisting of titanium tetrahalides and titanium halogenalcoholates. In some embodiments, the titanium compounds are selected from the group consisting of $TiCl_3$, $TiCl_4$, $Ti(OBu)_4$, $Ti(OBu)Cl_3$, $Ti(OBu)_2Cl_2$, and $Ti(OBu)_3Cl$. In some embodiments, the titanium compound is $TiCl_4$.

In some embodiments, the solid catalyst component (1) is made from or containing a titanium compound in an amount providing from 0.5 to 10% by weight of Ti with respect to the total weight of the solid catalyst component (1).

In some embodiments, solid catalyst component (1) is made from or containing a stereoregulating internal electron donor compound selected from mono or bidentate organic Lewis bases. In some embodiments, solid catalyst component (1) is made from or containing a stereoregulating internal electron donor compound selected from the group consisting of esters, ketones, amines, amides, carbamates, carbonates, ethers, nitriles, alkoxysilanes, and combinations thereof.

In some embodiments, the electron donors are selected from the group consisting of aliphatic or aromatic mono- or dicarboxylic acid esters and diethers.

In some embodiments, the alkyl and aryl esters of optionally substituted aromatic polycarboxylic acids are selected from the group consisting of esters of phthalic acids. In some embodiments, the esters of phthalic acids are as described in European Patent Application Nos. EP 45977A2 and EP395083A2.

In some embodiments, the internal electron donor is selected from the group consisting of mono- or di-substituted phthalates, wherein the substituents are independently selected from the group consisting of linear or branched $C_{1-10}$ alkyl, $C_{3-8}$ cycloalkyl and aryl radicals.

In some embodiments, the internal electron donor is selected from the group consisting of di-isobutyl phthalate, di-n-butyl phthalate, di-n-octyl phthalate, diphenyl phthalate, benzylbutyl phthalate, and combinations thereof.

In some embodiments, the internal electron donor is di-isobutyl phthalate.

In some embodiments, the esters of aliphatic acids are from malonic acids, glutaric acids, or succinic acids. In some embodiments, the esters of malonic acids are as described in Patent Cooperation Treaty Publication Nos. WO98/056830, WO98/056833, and WO98/056834. In some embodiments, the esters of glutaric acids are as described in Patent Cooperation Treaty Publication No. WO00/55215. In some embodiments, the esters of succinic acids are as described in Patent Cooperation Treaty Publication No. WO00/63261.

In some embodiments, the diesters are derived from esterification of aliphatic or aromatic diols. In some embodiments, the diesters are as described in Patent Cooperation Treaty Publication No. WO2010/078494 and U.S. Pat. No. 7,388,061.

In some embodiments, the internal electron donor is selected from 1,3-diethers of formula (I)

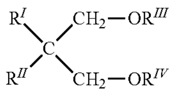

wherein $R^I$ and $R^{II}$ are independently selected from $C_{1-18}$ alkyl, $C_{3-18}$ cycloalkyl, and $C^{7-18}$ aryl radicals, $R^{III}$ and $R^{IV}$ are independently selected from $C_{1-4}$ alkyl radicals; or the carbon atom in position 2 of the 1,3-diether belongs to a cyclic or polycyclic structure made up of from 5 to 7 carbon atoms, or of 5-n or 6-n' carbon atoms, and respectively n nitrogen atoms and n' heteroatoms selected from the group consisting of N, O, S and Si, where n is 1 or 2 and n' is 1, 2, or 3, wherein the structure containing two or three unsaturations (cyclopolyenic structures), and optionally being condensed with other cyclic structures, or substituted with one or more substituents selected from the group consisting of linear or branched alkyl radicals; cycloalkyl, aryl, aralkyl, alkaryl radicals, and halogens, or being condensed with other cyclic structures and substituted with one or more substituents, wherein one or more of the alkyl, cycloalkyl, aryl, aralkyl, or alkaryl radicals and the condensed cyclic structures optionally contain one or more heteroatom(s) as substitutes for carbon and/or hydrogen atoms. In some embodiments, the substituents are bonded to the condensed cyclic structures. In some embodiments, the ethers are as described in European Patent Application Nos. EP361493 and EP728769 and Patent Cooperation Treaty Publication No. WO02/100904.

In some embodiments, 1,3-diethers are used and the external electron donor (3) is absent.

In some embodiments, mixtures of internal donors are used. In some embodiments, the mixtures are between aliphatic or aromatic mono or dicarboxylic acid esters and 1,3-diethers as described in Patent Cooperation Treaty Publication Nos. WO07/57160 and WO2011/061134.

In some embodiments, the magnesium halide support is magnesium dihalide.

In some embodiments, the amount of internal electron donor which remains fixed on the solid catalyst component (1) is 5 to 20% by moles, with respect to the magnesium dihalide.

In some embodiments, preparation of the solid catalyst components involves a reaction of Mg dihalide precursors with titanium chlorides to form the Mg dihalide support. In some embodiments, the reaction is carried out in the presence of the steroregulating internal donor.

In some embodiments, the magnesium dihalide precursor is a Lewis adduct of formula $MgCl_2.nR1OH$, where n is a number between 0.1 and 6, and R1 is a hydrocarbon radical having 1-18 carbon atoms. In some embodiments, n ranges from 1 to 5, alternatively from 1.5 to 4.5.

In some embodiments, the adduct is prepared by mixing alcohol and magnesium chloride, operating under stirring conditions at the melting temperature of the adduct (100-130° C.).

Then, the adduct is mixed with an inert hydrocarbon immiscible with the adduct thereby creating an emulsion which is quickly quenched causing the solidification of the adduct in the form of spherical particles.

In some embodiments, the resulting adduct is directly reacted with the Ti compound or subjected to thermal controlled dealcoholation (80-130° C.), thereby obtaining an adduct wherein the number of moles of alcohol is lower than 3 alternatively between 0.1 and 2.5. In some embodiments, this controlled dealcoholation step is carried out to increase the morphological stability of the catalyst during polymerization or to increase the catalyst porosity as described in European Patent Application No. EP395083A2.

In some embodiments, the reaction with the Ti compound is carried out by suspending the optionally-dealcoholated adduct in cold $TiCl_4$. In some embodiment, cold $TiCl_4$ is at 0° C. In some embodiments, the mixture is heated up to 80-130° C. and kept at this temperature for 0.5-2 hours. In some embodiments, the treatment with $TiCl_4$ is carried out one or more times. In some embodiments, the stereoregulating internal donor is added during the treatment with $TiCl_4$. In some embodiments, the treatment with the internal donor is repeated one or more times.

In some embodiments, the preparation of catalyst components is as described in U.S. Pat. Nos. 4,399,054 and 4,469,648, Patent Cooperation Treaty Publication No. WO98/44009A1, and European Patent Application No. EP395083A2.

In some embodiments, the catalyst component (1) is in the form of spherical particles having an average diameter ranging from 10 to 350 μm, a surface area ranging from 20 to 250 $m^2/g$, alternatively from 80 to 200 $m^2/g$, and porosity greater that 0.2 ml/g, alternatively of from 0.25 to 0.5 ml/g, wherein the surface area and the porosity are measured by BET.

In some embodiments, the catalyst system is made from or containing an Al-containing cocatalyst (2). In some embodiments, the Al-containing cocatalyst (2) is selected from the group consisting of Al-trialkyls, alternatively the group consisting of Al-triethyl, Al-triisobutyl, and Al-tri-n-butyl.

In some embodiments, the Al/Ti weight ratio in the catalyst system is from 1 to 1000, alternatively from 20 to 800.

In some embodiments, the catalyst system is further made from or containing electron donor compound (3) (external electron donor). In some embodiments, the external electron donor is selected from the group consisting of silicon compounds, ethers, esters, amines, heterocyclic compounds, and ketones. In some embodiments, the heterocyclic compound is 2,2,6,6-tetramethylpiperidine.

In some embodiments, the external donor is selected from the group consisting of silicon compounds of formula (R2)a(R3)bSi(OR4)c, where a and b are integers from 0 to 2, c is an integer from 1 to 4, and the sum (a+b+c) is 4; R2, R3, and R4 are alkyl, cycloalkyl or aryl radicals with 1-18 carbon atoms, optionally containing heteroatoms. In some embodiments, a is 1, b is 1, c is 2, at least one of R2 and R3 is selected from branched alkyl, cycloalkyl or aryl groups with 3-10 carbon atoms, optionally containing heteroatoms, and R4 is a C1-C10 alkyl group. In some embodiments, R4 is a methyl group.

In some embodiments, the silicon compounds are selected from the group consisting of methylcyclohexyldimethoxysilane (C-donor), diphenyldimethoxysilane, methyl-t-butyldimethoxysilane, dicyclopentyldimethoxysilane (D-donor), diisopropyldimethoxysilane, (2-ethylpiperidinyl)t-butyldimethoxysilane, (2-ethylpiperidinyl) thexyldimethoxysilane, (3,3,3-trifluoro-n-propyl)(2-ethylpiperidinyl)dimethoxysilane, methyl(3,3,3-trifluoro-n-propyl)dimethoxysilane, and combinations thereof.

In some embodiments, the silicon compounds are wherein a is 0, c is 3, R3 is a branched alkyl or cycloalkyl group, optionally containing heteroatoms, and R4 is methyl. In some embodiments, the silicon compounds are selected from the group consisting of cyclohexyltrimethoxysilane, t-butyltrimethoxysilane, and hexyltrimethoxysilane.

In some embodiments, the catalyst system is made from or containing di-isobutyl phthalate as internal electron donor and dicyclopentyl dimethoxysilane (D-donor) as external electron donor (3).

In some embodiments, the catalyst system is pre-contacted with small quantities of olefin (prepolymerization), maintaining the catalyst in suspension in a hydrocarbon solvent, and polymerizing at temperatures from 25° to 60° C., thereby producing a quantity of polymer from about 0.5 to about 3 times the weight of the catalyst system.

In some embodiments, the prepolymerization is carried out in liquid monomer, thereby producing a quantity of polymer 1000 times the weight of the catalyst system.

In some embodiments, sequential polymerization processes for preparing the polyolefin compositions are as described in European Patent Application No. EP472946 and Patent Cooperation Treaty Publication No. WO03/011962, which content is incorporated in this patent application.

In some embodiments, components (A) and (B) are produced in any of the polymerization stages.

In some embodiments, the polymerization process includes polymerizations stages carried out in the presence of a stereospecific Ziegler-Natta catalyst system, wherein:

(a) in the first copolymerization stage, monomers are polymerized to form the propylene copolymer (A); and
(b) in the second copolymerization stage, the relevant monomers are polymerized to form the propylene copolymer (B).

In some embodiments, the second copolymerization stage (b) includes a copolymerization stage (b1) and a copolymerization stage (b2), wherein the comonomers are polymerized to form propylene copolymer (B1) in stage (1) and propylene copolymer (B2) in stage (b2).

In some embodiments, the second copolymerization stage (b) includes a copolymerization stage (b1) and a copolymerization stage (b2), wherein propylene copolymer (B2) is formed in copolymerization stage (b1) and propylene copolymer (B1) is formed in copolymerization stage (b2).

In some embodiments, the polymerization is continuous or batch. In some embodiments, the polymerization is carried out according to cascade techniques, operating either in mixed liquid phase/gas phase or totally in gas phase.

In some embodiments, the liquid-phase polymerization is in slurry, solution, or bulk (liquid monomer). In some embodiments, the liquid-phase polymerization is carried out in various types of reactors. In some embodiments, the reactors are continuous stirred tank reactors, loop reactors, or plug-flow reactors.

In some embodiments, the gas-phase polymerization stages are carried out in gas-phase reactors. In some embodiments, the gas-phase reactors are fluidized or stirred, fixed bed reactors.

In some embodiments, the copolymerization stage (a) is carried out in liquid phase using liquid propylene as diluent and the copolymerization stage (b), or the copolymerization stages (b1) and (b2), are carried out in the gas phase.

In some embodiments, the copolymerization stage (a) is carried out in the gas phase.

In some embodiments, the reaction temperatures of the polymerization stages (a), (b), (b1), and (b2) are independently selected from values in the range from 40° to 90° C.

In some embodiments, the polymerization pressure of the copolymerization stage (a) carried out in liquid phase is from 3.3 to 4.3 MPa.

In some embodiments, the polymerization pressure of the copolymerization stages (a), (b), (b1), and (b2) carried out in gas-phase is independently selected from values in the range from 0.5 to 3.0 MPa.

In some embodiments, the residence time of each polymerization stage depends upon the ratio of components (A) and (B), or of components (A), (B1), and (B2), of the polyolefin composition.

In some embodiments, the residence time in each polymerization stage ranges from 15 minutes to 8 hours.

In some embodiments, the polyolefin composition is prepared by a sequential polymerization process and the amounts of components (A) and (B), or of components (A), (B1), and (B2), correspond to the split between the polymerization reactors.

In some embodiments, the molecular weight of the propylene copolymers obtained in the polymerization stages is regulated using chain transfer agents. In some embodiments, the chain transfer agent is hydrogen or $ZnEt_2$.

In some embodiments, the polyolefin composition is blended with additives at the end of the polymerization reaction.

In some embodiments, the polyolefin composition is an additive-containing polyolefin composition (AD1) made from or containing a total amount up to and including 0.3% by weight, alternatively 0.01-0.3% by weight, with respect to the total amount of the additive-containing polyolefin composition (AD1), of a first additive (C) selected from the group consisting of antistatic agents, anti-oxidants, anti-acids, melt stabilizers, and combinations thereof.

In some embodiments, the polyolefin composition is an additive-containing polyolefin composition (AD1) consisting of component (A), component (B), and the first additive (C). In some embodiments, the first additive (C) is present in a total amount up to and including 0.3% by weight, alternatively from 0.01 to 0.3% by weight, with respect to the total amount of the additive-containing polyolefin composition (AD1), wherein the total weight of the additive-containing polyolefin composition (AD1) being 100.

In some embodiments, the polyolefin composition is further made from or containing a second additive (D) selected from the group consisting of fillers, pigments, nucleating agents, extension oils, flame retardants, UV resistant additives, UV stabilizers, lubricants, antiblocking agents, waxes, coupling agents for fillers, and combinations thereof. In some embodiments, the flame retardant is aluminum trihydrate. In some embodiments, the UV resistant additive is titanium dioxide. In some embodiments, the lubricant is oleamide.

In some embodiments, the additive-containing polyolefin composition is made from or containing up to and including 50% by weight, alternatively from 0.01 to 50% by weight, alternatively from 0.5 to 30% by weight, of the second additive (D), wherein the amount of the second additive (D) being based on the total weight of the polyolefin composition made from or containing the second additive (D), the total weight being 100.

In some embodiments, the polyolefin composition is an additive-containing polyolefin composition (AD2) made from or containing

- component (A);
- component (B);
- up to and including 0.3% by weight, alternatively 0.01-0.3% by weight, of a first additive, component (C); and
- up to and including 50% by weight, alternatively from 0.01 to 50% by weight, alternatively from 0.5 to 30% by weight, of a second additive, component (D),
- wherein the amounts are components (A) and (B) are based on the total weight of (A)+(B) and the amount of the first additive component (C) and the second additive component (D) are based on the total weight of the additive-containing polyolefin composition (AD2), the total weight being 100.

In some embodiments, the first additive component (C) and the second additive component (D) are selected from the groups described above.

In some embodiments, the additive-containing polyolefin composition (AD2) consists of components (A), (B), (C) and (D).

In some embodiments, the present disclosure provides a sheet or membrane made from or containing the polyolefin composition.

In some embodiments, the sheet or membrane is made from or containing additive-containing polyolefin (AD1) or additive-containing polyolefin composition (AD2).

In some embodiments, the sheet or membrane has total thickness in the range from 1000 to 2000 μm, alternatively from 1200 to 1800 μm.

In some embodiments, the sheet or membrane is a monolayer or a multilayer sheet or membrane.

In some embodiments, the sheet or membrane is a monolayer sheet or membrane made from or containing the polyolefin composition, the additive-containing polyolefin composition (AD1), or the additive-containing polyolefin composition (AD2).

In some embodiments, the monolayer sheet or membrane consists of the polyolefin composition, the additive-containing polyolefin composition (AD1), or the additive-containing polyolefin composition (AD2).

In some embodiments, the sheet or membrane is a multilayer sheet or membrane made from or containing a layer X, wherein the layer X is made from or containing the polyolefin composition, the additive-containing polyolefin composition (AD1), or the additive-containing polyolefin composition (AD2).

In some embodiments, the layer X consists of the polyolefin composition, the additive-containing polyolefin composition (AD1), or the additive-containing polyolefin composition (AD2).

In some embodiments, the multilayer sheet or membrane is made from or containing a layer X and a layer Y, wherein the layer X and the layer Y are made from or containing a polyolefin independently selected from the group consisting of the polyolefin composition, the additive-containing polyolefin composition (AD1), and the additive-containing polyolefin composition (AD2).

In some embodiments, the multilayer sheet or membrane is made from or containing a layer X and a layer Y, wherein the layer X and the layer Y consist of a polyolefin independently selected from the group consisting of the polyolefin composition, the additive-containing polyolefin composition (AD1), and the additive-containing polyolefin composition (AD2).

In some embodiments, the multilayer sheet or membrane consists of a layer X and a layer Y, wherein the layer X and the layer Y are made from or containing a polyolefin independently selected from the group consisting of the polyolefin composition, the additive-containing polyolefin composition (AD1), and the additive-containing polyolefin composition (AD2).

In some embodiments, the multilayer sheet or membrane consists of a layer X and a layer Y, wherein the layer X and the layer Y consist of a polyolefin independently selected from the group consisting of the polyolefin composition, the additive-containing polyolefin composition (AD1), and the additive-containing polyolefin composition (AD2).

In some embodiments, the multilayer sheet or membrane is made from or containing layers X, Y, and Z, and has layers' structure X/Z/Y, wherein layer X and layer Y are as described above, and layer Z is a reinforcing layer made from or containing a plastic material selected from the group consisting of propylene homopolymers, propylene copolymers, polyethylene, polyethylene terephthalate, and combinations thereof.

In some embodiments, the layer Z is a woven fabric or a non-woven fabric.

In some embodiments, the monolayer sheets or membranes are obtained by calendaring, extrusion or spread coating. In some embodiments, the monolayer sheet or membrane is obtained by extrusion.

In some embodiments, multilayer sheets or membranes are obtained by co-extrusion of the polyolefin in the layers or by lamination of the layers.

In some embodiments, the sheet or membrane is a single-ply roofing sheet or membrane.

In some embodiments, the sheet or membrane is a geomembrane.

The features describing the subject matter of the present disclosure are not inextricably linked to each other. Accordingly, a level of a first feature does not necessarily involve the same level of additional features. The present disclosure supports selection of any combination of parametric ranges and/or features, even though the combination may not be explicitly described herein.

EXAMPLES

The following examples are illustrative and not intended to limit the scope of the disclosure in any manner whatsoever.

Characterization Methods

The following methods are used to determine the properties indicated in the description, claims and examples.

Melt Flow Rate: Determined according to the method ISO 1133 (230° C., 2.16 kg).

Solubility in xylene at 25° C.: 2.5 g of polymer sample and 250 ml of xylene were introduced into a glass flask equipped with a refrigerator and a magnetic stirrer. The temperature was raised in 30 minutes up to 135° C. The resulting clear solution was kept under reflux and stirred for further 30 minutes. The solution was cooled in two stages. In the first stage, the temperature was lowered to 100° C. in air for 10 to 15 minute under stirring. In the second stage, the flask was transferred to a thermostatically-controlled water bath at 25° C. for 30 minutes. The temperature was lowered to 25° C. without stirring during the first 20 minutes and maintained at 25° C. with stirring for the last 10 minutes. The formed solid was filtered on quick filtering paper (for example, Whatman filtering paper grade 4 or 541). 100 ml of the filtered solution (51) was poured into a pre-weighed aluminum container, which was heated to 140° C. on a heating plate under nitrogen flow, thereby removing the solvent by evaporation. The container was then kept in an oven at 80° C. under vacuum until constant weight was reached. The amount of polymer soluble in xylene at 25° C. was then calculated. XS(tot) and $XS_A$ values were experimentally determined. The fraction of component (B) soluble in xylene at 25° C. ($XS_B$) was calculated from the formula:

$$XS=W(A)\times(XS_A)+W(B)\times(XS_B)$$

wherein W(A) and W(B) are the relative amounts of components (A) and (B), respectively, and W(A)+W(B)=1.

Intrinsic viscosity of the xylene soluble fraction: to calculate the value of the intrinsic viscosity IV, the flow time of a polymer solution was compared with the flow time of the solvent tetrahydronaphthalene (THN). A glass capillary viscometer of Ubbelohde type was used. The oven temperature was adjusted to 135° C. Before starting the measurement of the solvent flow time to, the temperature was stable (135°±0.2° C.). Sample meniscus detection for the viscometer was performed by a photoelectric device.

Sample preparation: 100 ml of the filtered solution (S1) was poured into a beaker, and 200 ml of acetone were added under vigorous stirring. Precipitation of insoluble fraction was complete as evidenced by a clear solid-solution separation. The suspension was filtered on a weighed metallic screen (200 mesh). The beaker was rinsed. The precipitate was washed with acetone, thereby removing the o-xylene completely. The precipitate was dried in a vacuum oven at 70° C. until a constant weight was reached. 0.05 g of precipitate were dissolved in 50 ml of tetrahydronaphthalene (THN) at a temperature of 135° C. The efflux time t of the sample solution was measured and converted into a value of intrinsic viscosity [η] using Huggins' equation (Huggins, M. L., J. Am. Chem. Soc. 1942, 64, 11, 2716-2718) and the following data:

concentration (g/dl) of the sample;

the density of the solvent at a temperature of 135° C.;

the flow time t0 of the solvent at a temperature of 135° C. on the same viscometer.

A single polymer solution was used to determine [η].

Comonomer content: $^{13}C$ NMR spectra were acquired on a Bruker AV-600 spectrometer equipped with cryoprobe, operating at 160.91 MHz in the Fourier transform mode at 120° C. The peak of the $S_{\delta\delta}$ carbon (nomenclature according to "Monomer Sequence Distribution in Ethylene-Propylene Rubber Measured by $^{13}C$ NMR. 3. Use of Reaction Probability Mode" C. J. Carman, R. A. Harrington and C. E. Wilkes, Macromolecules, 1977, 10, 536) was used as an internal standard at 29.9 ppm. The samples were dissolved in 1,1,2,2-tetrachloroethane-d2 at 120° C. with an 8% wt/v concentration. Each spectrum was acquired with a 90° pulse, and 15 seconds of delay between pulses and CPD, thereby removing $^{1}H$-$^{13}C$ coupling. 512 transients were stored in 32K data points using a spectral window of 9000 Hz. The assignments of the spectra, the evaluation of triad distribution and the composition were made according to Kakugo ("Carbon-13 NMR determination of monomer sequence distribution in ethylene-propylene copolymers prepared with δ-titanium trichloride-diethylaluminum chloride" M. Kakugo, Y. Naito, K. Mizunuma and T. Miyatake, Macromolecules, 1982, 15, 1150) using the following equations:

$$PPP = 100\ T_{\beta\beta}/S \quad PPE = 100\ T_{\beta\delta}/S \quad EPE = 100\ T_{\delta\delta}/S$$

$$PEP = 100\ S_{\beta\beta}/S \quad PEE = 100\ S_{\beta\delta}/S \quad EEE = 100\ (0.25\ S_{\gamma\delta} + 0.5\ S_{\delta\delta})/S$$

$$S = T_{\beta\beta} + T_{\beta\delta} + T_{\delta\delta} + S_{\beta\beta} + S_{\beta\delta} + 0.25\ S_{\gamma\delta} + 0.5\ S_{\delta\delta}$$

The molar content of ethylene and propylene was calculated from triads using the following equations:

$$[E]\text{mol}=EEE+PEE+PEP$$

$$[P]\text{mol}=PPP+PPE+EPE$$

The weight percentage of ethylene content (E % wt) was calculated using the following equation:

$$E\%\ \text{wt} = \frac{[E]\ \text{mol}\times MWE}{([E]\ \text{mol}\times MWE)+([P]\ \text{mol}\times MWP)}\times 100$$

wherein

[P] mol=the molar percentage of propylene content;

MWE=molecular weights of ethylene

MWP=molecular weight of propylene.

The product of reactivity ratio $r_1r_2$ was calculated according to Carman (C. J. Carman, R. A. Harrington and C. E. Wilkes, *Macromolecules,* 1977; 10, 536) as:

$$r_1r_2 = 1+\left(\frac{EEE+PEE}{PEP}+1\right)-\left(\frac{P}{E}+1\right)\left(\frac{EEE+PEE}{PEP}+1\right)^{0.5}$$

The tacticity of propylene sequences was calculated as mm content from the ratio of the PPP $mmT_{\beta\beta}$ (28.90-29.65 ppm) and the whole $T_{\beta\beta}$ (29.80-28.37 ppm).

The amount of ethylene of component B) was calculated from the total ethylene content of the polymer (C2(tot)) using the formula:

$$C2(\text{tot})=W(A)\times C2(A)+W(B)\times C2(B)$$

wherein W(A) and W(B) were the relative amounts of components (A) and (B) (W(A)+W(B)=1), and C2(A) and C2(B) were the weight percentages of ethylene in component (A) and (B).

Injection-molded specimens: test specimens 80×10×4 mm were obtained according to the method ISO 1873-2: 2007.

Flexural modulus: Determined according to the method ISO 178:2019 on injection-molded test specimens.

Strength and Elongation at break: Determined according to the method ISO 527 on injection-molded test specimens.

Shore A and D on injection-molded specimens: Determined according to the method ISO 868 (15 sec).

Vicat softening temperature: Determined according to the method ISO 306 (A50) on injection-molded specimens.

Charpy Impact test at −40° C.: measured according to ISO 179/1eA 2010 on injection-molded specimens.

Tensile Modulus (MD and TD): Determined according to the method ISO 527-3 on 1 mm-thick extruded sheets. Specimens type 2, Crosshead speed: 1 mm/min.

Tensile strength and elongation at break (MD and TD): Determined according to the method ISO527-3 on 1 mm-thick extruded sheets. Specimens type: 5, Crosshead speed: 500 mm/min.

Tear resistance: Determined according to the method ASTM D 1004 on 1 mm-thick extruded sheets. Crosshead speed: 51 mm/min; V-shaped die cut specimen.

Puncture resistance and deformation: Determined according to the method ASTM D 4833 on 1 mm-thick extruded sheets. Punch diameter 8 mm, crosshead speed: 300 mm/min.

Shore A and D on extruded sheets: Determined according to the method ISO 868 (15 sec) on 1 mm-thick extruded sheets.

Preparation of extruded specimens: the polymer, in form of granules, was fed via feed hoppers into a Leonard extruder (mono-screw extruder, 40 mm in diameter and 27 L/D in length) wherein the polymer was melted (melt temperature 230° C.), compressed, mixed, and metered out at a throughput rate of 10 Kg/h with a metering pump (15 cc/rpm). The molten polymer left the flat die (width 200 mm, die lip at 0.8-0.9 mm) and was instantly cooled through a vertical three-rolls calender having roll-temperature of 60° C. 1 mm-thick extruded sheets were obtained.

Examples 1 and Comparative Example 2

The polymerization was carried out in two gas phase reactors connected in series and equipped with devices to transfer the product from the first reactor to the second reactor.

For the polymerization, a Ziegler-Natta catalyst system was used made from or containing:

- a titanium-containing solid catalyst component prepared as described in European Patent Application No. EP395083, Example 3, according to which di-isobutyl phthalate was used as internal electron donor compound;
- triethylaluminium (TEAL) as co-catalyst; and
- Dicyclopentyl dimethoxysilane (DCPMS) as external electron donor.

The solid catalyst component was contacted with TEAL and DCPMS in a pre-contacting vessel, with a weight ratio of TEAL to the solid catalyst component of 4-5 and a weight ratio TEAL/DCPMS of 5.

The catalyst system was then subjected to pre-polymerization by suspending the catalyst system in liquid propylene at 20° C. for about 30-32 minutes before introducing the catalyst system into the first polymerization reactor.

Propylene copolymer (A) was produced into the first gas-phase reactor by feeding, in a continuous and constant flow, the pre-polymerized catalyst system, hydrogen (used as molecular weight regulator), propylene, and ethylene, in gaseous phase.

The propylene copolymer (A) coming from the first reactor was discharged in a continuous flow and, after having been purged of unreacted monomers, was introduced, in a continuous flow, into the second gas-phase reactor, together with quantitatively constant flows of hydrogen and ethylene, in the gas state.

In the second reactor, the propylene copolymer (B) was produced.

Polymerization conditions, molar ratio of the reactants, and composition of the copolymers obtained are shown in Table 1.

TABLE 1 polymerization conditions

| | | Ex. 1 | Comp. Ex. 2 |
|---|---|---|---|
| GPR 1 - component A | | | |
| Temperature | ° C. | 60 | 70 |
| Pressure | barg | 18 | 18 |
| $H_2/C_3-$ | mol. | 0.14 | 0.10 |
| $C_2-/(C_2- + C_3-)$ | mol | 0.020 | 0.01 |
| Split | wt % | 24 | 31 |
| Xylene solubles of A ($XS_A$) | wt % | 7.6 | 5.5 |
| MFR of A ($MFR_A$) | g/10 min. | 44 | 25 |
| $C_2-$ content of A | wt % | 3.3 | 3.2 |
| GPR 2 - Component B | | | |
| Temperature | ° C. | 60 | 60 |
| Pressure | barg | 18 | 18 |
| $H_2/C_2-$ | mol. | 0.108 | 0.09 |
| $C_2-/(C_2- + C_3-)$ | mol. | 0.16 | 0.16 |
| Split | wt % | 76 | 69 |
| $C_2-$ content of B(*) | wt % | 27 | 27 |
| $C_2-$ content of (A + B) | wt % | 21.4 | 19.4 |
| Xylene solubles of (A + B) (XS) | wt % | 74.0 | 63.3 |
| Intrinsic viscosity of (A + B) (XSIV) | dl/g | 3.02 | 3.18 |
| MFR of (A + B) | g/10 min. | 0.51 | 0.61 |

Notes:
C2− = ethylene in gas phase (IR); C3− = propylene in gas phase (IR); split = amount of polymer produced in the concerned reactor.
(*)Calculated values.

The polymer particles exiting the second reactor were subjected to a steam treatment, thereby removing the unreacted monomers and volatile compounds, and then dried.

The resulting polyolefin composition was mixed with additives in a twin screw extruder Berstorff ZE 25 (length/diameter ratio of screws: 34) and extruded under nitrogen atmosphere in the following conditions:

Rotation speed: 250 rpm;

Extruder output: 15 kg/hour;

Melt temperature: 245° C.

The additives were:

0.1% by weight of Irganox® 1010;

0.1% by weight of Irgafos® 168; and 0.05% by weight of DHT-4A®, wherein the amounts of additives are based on the total weight of the polyolefin composition containing the additives.

Irganox® 1010 is 2,2-bis[3-[, 5-bis(1,1-dimethylethyl)-4-hydroxyphenyl]-1-oxopropoxy]methyl]-1,3-propanediyl-3, 5-bis(1,1-dimethylethyl)-4-hydroxybenzene-propanoate; Irgafos® 168 is tris(2,4-di-tert.-butylphenyl) phosphite; DHT-4A® is Magnesium Aluminum Carbonate Hydroxide (hydrate).

Properties of the materials tested on injection-molded specimens are reported in Table 3. Properties of the material tested on extruded sheets are reported in Table 4.

Example 3 and Comparative Example 4

Using the same catalyst system as for example 1, polyolefin compositions were prepared in three gas phase reactors connected in series and equipped with devices to transfer the product between the reactors.

Propylene copolymer (A) was produced into the first gas-phase reactor by feeding, in a continuous and constant flow, the pre-polymerized catalyst system, hydrogen (used as molecular weight regulator), propylene, and ethylene, in gaseous phase.

The propylene copolymer (A) coming from the first reactor was discharged in a continuous flow and, after having been purged of unreacted monomers, was introduced, in a continuous flow, into the second gas-phase reactor, together with quantitatively constant flows of hydrogen and ethylene, in the gas state.

In the second reactor, the propylene copolymer (B1) was produced. The product coming from the second reactor was discharged in a continuous flow and, after having been purged of unreacted monomers, was introduced, in a continuous flow, into the third gas-phase reactor, together with quantitatively constant flows of hydrogen, ethylene and propylene, in the gas state. In the third reactor, an ethylene-propylene polymer (B2) was produced.

Polymerization conditions, molar ratios of the reactants and composition of the copolymers obtained are shown in Table 2.

TABLE 2 polymerization conditions

| | | Ex. 3 | Comp. Ex. 4 |
|---|---|---|---|
| **GPR 1 - component A** | | | |
| Temperature | ° C. | 55 | 60 |
| Pressure | barg | 16 | 18 |
| $H_2/C_3-$ | mol. | 0.14 | 0.04 |
| $C_2-/(C_2- + C_3-)$ | mol | 0.024 | 0.030 |
| Split | wt % | 21 | 21 |
| Xylene solubles of A ($XS_A$) | wt % | 8.1 | <8.0 |
| MFR of A ($MFR_A$) | g/10 min. | 33 | 5.5 |
| $C_2-$ content of A | wt % | 3.2 | 3.2 |
| **GPR 2 - Component B1** | | | |
| Temperature | ° C. | 55 | 64 |
| Pressure | barg | 16 | 18 |
| $H_2/C_2-$ | mol. | 0.089 | 0.015 |
| $C_2-/(C_2- + C_3-)$ | mol. | 0.16 | 0.16 |
| Split | wt % | 39 | 49 |
| $C_2-$ content of B1(*) | wt % | 30 | 26 |
| $C_2-$ content of (A + B1) | wt % | 20.4 | 19.4 |
| Xylene solubles of (A + B1) | wt % | 61.0 | 63.3 |
| Intrinsic viscosity (A + B1) (XSIV) | dl/g | 3.10 | 4.80 |
| MFR of (A + B1) | g/10 min. | 1.00 | 0.61 |
| **GPR 3 - Component B2** | | | |
| Temperature | ° C. | 55 | 60 |
| Pressure | barg | 16 | 18 |
| H2/C2− | mol. | 0.075 | 0.009 |
| C2−/(C2− + C3−) | mol. | 0.17 | 0.21 |
| Split | wt % | 40 | 30 |
| C2− content of B2(*) | wt % | 27 | 40 |

TABLE 2-continued polymerization conditions

| | | Ex. 3 | Comp. Ex. 4 |
|---|---|---|---|
| C2− content of (A + B1 + B2) | wt % | 23.2 | 25.5 |
| Xylene solubles of (A + B1 + B2) (XS) | wt % | 74.4 | 73.0 |
| Intrinsic viscosity (A + B1 + B2) (XSIV) | dl/g | 3.39 | 5.50 |
| MFR of (A + B1 + B2) | g/10 min. | 0.4 | <0.1 |

Notes:

C2− = ethylene in gas phase (IR); C3− = propylene in gas phase (IR); split = amount of polymer produced in the concerned reactor.

(*)Calculated values.

The polymer particles exiting the third reactor were subjected to a steam treatment, thereby removing the unreacted monomers and volatile compounds, dried and melt-mixed with additives as described in example 1.

Properties of the materials tested on injection-molded specimens are reported in Table 3. Properties of the material tested on extruded sheets are reported in Table 4.

TABLE 3 characterization on injection molded specimens

| | | Ex. 1 | Comp. Ex. 2 | Ex. 3 | Comp. Ex. 4 |
|---|---|---|---|---|---|
| MFR | g/10 min | 0.51 | 0.61 | 0.40 | 0.65(**) |
| Flexural Modulus | MPa | 56 | 99 | 50 | 46 |
| Strength at break | MPa | 11.5 | 10.5 | 12.4 | 9.9 |
| Elongation at break | % | 440 | 400 | 510 | 505 |
| Vicat temperature (9.81N) | ° C. | 51 | 62 | 48 | 46 |
| Charpy Resistance −40° C. | $KJ/m^2$ | 6.1 | 5.2 | 6.5 | 5.2 |
| Shore A | | 86 | >90 | 84 | 79 |
| Shore D | | 25 | 31 | 25 | <20 |

(**)the polyolefin was cracked with 170 ppm of peroxide, thereby increasing the MFR and rendering the polyolefin processable with extruders for producing sheets or membranes.

TABLE 4 characterization on extruded sheets

| | | Ex. 1 | Comp. Ex. 2 | Ex. 3 | Comp. Ex. 4 |
|---|---|---|---|---|---|
| MFR | g/10 min | 0.51 | 0.61 | 0.40 | 0.65(**) |
| Tensile Modulus MD | MPa | 44 | 74 | 66 | 46 |
| Strength at break MD | MPa | 16.0 | 20.0 | 14.9 | 12.2 |
| Elongation at break MD | % | 730 | 760 | 660 | 690 |
| Tensile modulus TD | MPa | 41 | 71 | 40 | 32 |
| Strength at break TD | MPa | 14.5 | 20.2 | 14.0 | 12.1 |
| Elongation at break TD | % | 730 | 820 | 680 | 711 |
| Tear Resistance MD | g | 49 | 70 | 58 | 50 |
| Tear resistance TD | g | 54 | 70 | 58 | 46 |
| Puncture resistance | N | 186 | 241 | 210 | 165 |
| Puncture deformation | mm | 51 | 48 | 51 | 48 |
| Shore A | | 83 | >90 | 84 | 80 |
| Shore D | | 25 | 34 | 23 | 24 |

(**)the polyolefin was cracked with 170 ppm of peroxide, thereby increasing the MFR and rendering the polyolefin processable with extruders for producing sheets or membranes.

What is claimed is:

1. A polyolefin composition comprising:

(A) 18-35% by weight of a copolymer of propylene with an alpha-olefin of formula $CH_2=CHR$, where R is H or a linear or branched C2-C3 alkyl, wherein
 i) the copolymer contains 2.0-4.0% by weight of the alpha-olefin, the amount of the alpha-olefin is based on the total weight of (A); and
 ii) the propylene copolymer has a melt flow rate ($MFR_A$), measured according to ISO 1133, 230° C., 2.16 kg, ranging from 30 to 60 g/10 min; and (B) 65-82% by weight of a copolymer of propylene with an alpha-olefin of formula $CH_2=CHR$, and optionally a diene, where R is H or a linear or branched C2-C8 alkyl and wherein the copolymer comprises 20-35% by weight of the alpha-olefin, the amount of alpha olefin is based on the total weight of (B), wherein
 iii) the polyolefin composition comprises a fraction that is soluble in xylene at 25° C. (XS(tot)) in an amount higher than 70% by weight;
 iv) the amounts of (A), (B), and the fraction soluble in xylene at 25° C. (XS(tot)) are based on the total weight of the polyolefin composition, the total weight being 100; and
 v) the melt flow rate (MFR), measured according to ISO 1133, 230° C., 2.16 kg, of the polyolefin composition ranges from 0.2 to 2.0 g/10 min.

2. The polyolefin composition of claim 1, wherein component (A) is a copolymer of propylene with ethylene.

3. The polyolefin composition of claim 1, wherein the propylene copolymer (A) has a melt flow rate ($MFR_A$) measured according to ISO 1133, 230° C., 2.16 kg ranging from 35 to 50 g/10 min.

4. The polyolefin composition according to claim 1, wherein the propylene copolymer (A) comprises an amount of fraction soluble in xylene at 25° C. ($XS_A$) lower than 9.0% by weight, wherein the amount of $XS_A$ being based on the weight of copolymer (A).

5. The polyolefin composition according to claim 1, wherein component (B) comprises:

(B1) 30-60% by weight of a first copolymer of propylene with an alpha-olefin of formula $CH_2=CHR$, and optionally a diene, where R is H or a linear or branched C2-C8 alkyl, and wherein the first propylene copolymer comprises 20-40% by weight of the alpha-olefin and a fraction soluble in xylene at 25° C. ($XS_{B1}$) higher than 80% by weight, wherein the amounts of alpha-olefin and of $XS_{B1}$ are based on the weight of component (B1); and (B2) 40-70% by weight of a second copolymer of propylene with an alpha-olefin of formula $CH_2=CHR$, and optionally a diene, where R is H or a linear or branched C2-C8 alkyl, and wherein the second propylene copolymer comprises 25-45% by weight of the alpha-olefin and a fraction soluble in xylene at 25° C. ($XS_{B2}$) higher than 80% by weight, wherein the amounts of alpha-olefin and of $XS_{B2}$ are based on the weight of component (B2), wherein the amounts of (B1) and (B2) are based on the total weight of the component (B), the weight being 100.

6. The polyolefin composition according to claim 1, wherein the alpha-olefin in components (B), (B1), and (B2) is independently selected from the group consisting of ethylene, 1-butene, 1-hexene, 4-methyl-1-pentene, 1-octene, and combinations thereof.

7. The polyolefin composition according to claim 1, comprising an amount of fraction soluble in xylene (XS(tot)) at 25° C. ranging from 70 to 90% by weight, wherein the amount of XS(tot) is based on the total weight of the polyolefin composition.

8. The polyolefin composition according to claim 1, having the melt flow rate measured according to ISO 1133, 230° C., 2.16 kg ranging from 0.3 to 1.5 g/10 min.

9. The polyolefin composition according to claim 1, wherein the fraction soluble in xylene at 25° C. of the polyolefin composition has an intrinsic viscosity (XS(IV)) ranging from 2.5 to 4.5 dl/g.

10. The polyolefin composition according to claim 1, comprising:

(A) 18-35% by weight of a copolymer of propylene with ethylene
 i) comprising 2.0-4.0% by weight of ethylene, wherein the amount of ethylene being based on the weight of (A) and
 ii) having a melt flow rate ($MFR_A$) measured according to ISO 1133, 230° C., 2.16 kg ranging from 30 to 60 g/10 min.; and (B) 65-82% by weight of a copolymer of propylene with ethylene comprising 20-35% by weight of ethylene, wherein the amount of ethylene being based on the weight of (B), wherein
 iii) the polyolefin composition comprises an amount of fraction soluble in xylene at 25° C. (XS(tot)) higher than 70% by weight;
 iv) the amounts of (A), (B), and the fraction soluble in xylene at 25° C. (XS(tot)) are based on the total weight of the polyolefin composition, the total weight being 100;
 v) the melt flow rate (MFR) measured according to ISO 1133, 230° C., 2.16 kg of the polyolefin composition ranges from 0.2 to 2.0 g/10 min; and
 vi) the fraction soluble in xylene at 25° C. of the polyolefin composition (XS(tot)) has an intrinsic viscosity (XS(IV)) ranging from 2.5 to 4.5 dl/g.

11. The polyolefin composition according to claim 1, having one or more of the following properties:

(a) Flexural Modulus ranging from 40 to 90 MPa, wherein the Flexural Modulus is measured according to ISO 178:2019 on injection-molded specimens;

(b) Strength at break greater than or equal to 10.0 MPa, measured according to the method ISO 527 on injection-molded specimens;

(c) Charpy resistance at −40° C. equal to or higher than 6.0 $KJ/m^2$, measured according to ISO 179/1eA 2010 on injection-molded specimens;

(d) puncture resistance greater than or equal to 170 N, measured on a 1 mm-thick extruded sheet according to method ASTM D 4833 (punch diameter: 8 mm, crosshead speed: 300 mm/min);

(e) puncture deformation greater than or equal to 40 mm, measured on a 1 mm-thick extruded sheet according to method ASTM D 4833 (punch diameter: 8 mm, crosshead speed: 300 mm/min); or (f) Shore D value equal to or lower than 30, measured on 1 mm-thick extruded sheets according to method ISO 868 (15 sec).

12. A sheet or membrane comprising the polyolefin composition according to claim 1.

13. A multilayer sheet or membrane comprising layers X, Y, and Z and having layers' structure X/Z/Y, wherein layer X and layer Y comprise a polyolefin composition according to claim 1, and layer Z is a reinforcing layer comprising a plastic material selected from the group consisting of propylene homopolymers, propylene copolymers, polyethylene, polyethylene terephthalate and combinations thereof.

14. The sheet or membrane according to claim 12 in the form of a single-ply roofing sheet or membrane.

15. The sheet or membrane according to claim 12 in the form of a geomembrane.

* * * * *